Patented Nov. 20, 1951

2,575,750

UNITED STATES PATENT OFFICE 2,575,750

ACRYLONITRILE-ISOBUTYLENE COPOLY-
MER SYNTHETIC RESIN LATEX

John A. Davison, Waldwick, N. J., assignor to
United States Rubber Company, New York,
N. Y., a corporation of New Jersey No Drawing. Application August 25, 1948,
Serial No. 46,192

6 Claims. (Cl. 260—85.5)

This invention relates to a method of preparing acrylonitrile-isobutylene copolymer synthetic resin latices.

Acrylonitrile-isobutylene copolymer synthetic resin latices may be produced by the aqueous emulsion polymerization of a mixture of acrylonitrile and isobutylene in a closed reactor in the presence of an emulsifying agent and a peroxide type catalyst. The polymerization may be allowed to take place at temperatures from about 25° C. to 100° C., and the time of polymerization may be from 1 to 100 or more hours, depending on the temperature, catalyst, and degree of polymerization desired. After the desired polymerization, generally after conversion of 60 to 80% by weight of the original acrylonitrile to copolymer the residual unreacted monomeric materials are removed from the aqueous emulsion polymerizate or reaction mixture. The gaseous isobutylene may be vented off by releasing the pressure in the reactor, and the liquid acrylonitrile may be removed from the reaction mixture as by vacuum distillation, or steam distillation at atmospheric or reduced pressure. It has been found in practice that the synthetic resin latices thus prepared set up to a solid gel on standing from a few hours to a few days, and such gelation prevents utilization of the latex in processes where it must be fluid, as where the latex is to be used, generally after dilution, in fabric impregnation.

It is an object of the present invention to prepare acrylonitrile-isobutylene copolymer synthetic resin latices which will be fluid on standing even after extended periods of time, so that they may be utilized in processes requiring a fluid synthetic resin latex.

I have found that if, in the preparation of resin latices by the aqueous emulsion polymerization of a mixture of acrylonitrile and isobutylene, a small amount of ammonia is added to the aqueous emulsion polymerizate after the desired degree of polymerization, i. e. generally after conversion of 60% to 80% by weight of the original acrylonitrile to copolymer, and before removal of the residual unreacted acrylonitrile, the resulting synthetic resin latex will remain in liquid form without gelling for a considerably longer period than where ammonia is not added. The ammonia may be added to the aqueous emulsion polymerizate or reaction mixture before or after venting off the isobutylene, but the ammonia should be added before removal of the acrylonitrile. The added ammonia is generally distilled off with the removal of the acrylonitrile. The addition of ammonia to the synthetic resin latex after removal of the acrylonitrile does not act to retard the gelling of the latex.

The acrylonitrile and isobutylene are polymerized in aqueous emulsion in the usual manner of such synthetic resin polymerizations. The acrylonitrile may be from 10 to 90% by weight and the isobutylene correspondingly 90 to 10% by weight of the mixture of the acrylonitrile and isobutylene. Copolymers prepared by the emulsion polymerization of such mixtures of acrylonitrile and isobutylene will show by analysis 66 to 80% by weight of acrylonitrile. The weight ratio of water to the acrylonitrile and isobutylene present in the initial emulsion is not critical, and may be from 1:1 to 10:1 depending on the concentration of solids desired in the final emulsion polymerizate. The peroxide catalysts that may be used are conventional, the inorganic peroxides, such as hydrogen peroxide, persalts, e. g. alkali-metal or ammonium persulfates or percarbonates, or mixtures thereof, being preferred, although organic peroxides, such as acetyl peroxide, benzoyl peroxide and tertiary butyl hydroxyperoxide may be used. The amount of peroxide catalyst may be in the range from 0.1 to 1% by weight based on the acrylonitrile and isobutylene in the initial emulsion. The emulsifying agent may be any one or a mixture of the conventional type of surface-active agents used in the aqueous emulsion polymerizations of synthetic resins, such as alkali salts or fatty acids containing more than 8 carbon atoms (soaps), or sulfates or sulfonates of organic compounds containing at least one group having more than 8 carbon atoms, e. g., alkyl sulfates or sulfonates, sulfated or sulfonated ethers of long and short chain aliphatic groups, sulfated and sulfonated alkyl esters of long chain fatty acids, sulfonated alkyl substituted amides of long chain fatty acids, alkylated aryl sulfonates. The emulsifying agents may also be alkyl alkali sulfosuccinates, for example, the dioctyl ester of sodium sulfosuccinic acid, or the emulsifying agent may be condensation product of an aryl sulfonic acid or salt thereof with formaldehyde, for example, the condensation product of formaldehyde with the sodium salt of naphthalene sulfonic acid or phenol sulfonic acid. The amount of emulsifying agent is that generally used in synthetic resin emulsion polymerizations, namely, from 1 to 10% by weight based on the polymerizable monomers, viz., acrylonitrile and isobutylene, in the initial emulsion. The amount of ammonia added to the synthetic resin latex after the desired polymerization and before removal of the unreacted isobutylene need only be a small amount, generally 0.2 to 2% by weight based on the acrylonitrile and isobutylene in the initial emulsion. The ammonia may be added to the synthetic resin latex after the desired polymerization, either before or after venting off the isobutylene, provided the ammonia is added prior to the removal, as by distillation, of the higher boiling acrylonitrile.

The following illustrates the invention (all parts are by weight): An autoclave reactor was charged with 150 parts of water, 3½ parts of sodium lauryl sulfate (emulsifying and dispersing agent), 1½ parts of the condensation product of formaldehyde and sodium naphthalene sulfonate (additional emulsifying and dispersing agent), 0.5 part of potassium persulfate (catalyst), 1 part of dodecyl mercaptan (conventional regulator acting to control the length of the polymer chain), and 65 parts of acrylonitrile, after which 35 parts of isobutylene were introduced into the reactor in the form of a liquid under pressure. The charge was polymerized by agitating and heating at 45° C. to 50° C. for 14 hours. To various portions of the reaction mixture were added various amounts of ammonia from 0.05 to 1 part per 100 parts of acrylonitrile and isobutylene originally present, and to a control portion no ammonia was added. The isobutylene was then vented off from the various portions by reducing the pressure to atmospheric pressure, the acrylonitrile was removed by steam distillation at reduced pressure. The ammonia was automatically removed with the acrylonitrile in those portions where the various amounts of ammonia had been added. The portions of synthetic resin latex prepared as above were allowed to stand, and the time at which gelation occurred in each portion was noted. The control portion where no ammonia had been added prior to removal and the unreacted monomers gelled in two days, the portions to which 0.05 and 0.1 part of ammonia had been added per 100 parts of the acrylonitrile and isobutylene originally present, gelled in two to three days, showing no significant improvement. The portion to which 0.2 part of ammonia had been added per 100 parts of acrylonitrile originally present, did not gel until 8 days. Portions to which 0.4 and 0.6 part of ammonia had been added per 100 parts of the acrylonitrile and isobutylene originally present, did not gel until 24 and 72 days. Portions to which 0.8 and 1 part of ammonia had been added per 100 parts of acrylonitrile and isobutylene originally present were still fluid at the end of four months. Larger amounts of ammonia up to 2 parts or more may be added but it is not contemplated that over 2 parts will be needed in view of the satisfactory delayed gelling effect of the smaller amounts as shown by the above tests.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the method of preparing an acrylonitrile-isobutylene copolymer synthetic resin latex by polymerizing an aqueous emulsion of a mixture of acrylonitrile and isobutylene in the presence of a peroxide catalyst, the steps of adding to the reaction mixture 0.2 to 2 parts by weight of ammonia per 100 parts of acrylonitrile and isobutylene initially present after conversion of 60% to 80% by weight of the original acrylonitrile to copolymer and before removing unreacted acrylonitrile, and thereafter removing residual unreacted polymerizable monomeric material from the reaction mixture.

2. The method of preparing an acrylonitrile-isobutylene copolymer synthetic resin latex which comprises maintaining an aqueous emulsion of a mixture of acrylonitrile and isobutylene containing a peroxide catalyst in a closed reactor at 25° C. to 100° C. to polymerize the same, and after conversion of 60% to 80% by weight of the original acrylonitrile to copolymer and before removing unreacted acrylonitrile, adding to the reaction mixture 0.2 to 2 parts by weight of ammonia per 100 parts of the acrylonitrile and isobutylene initially present, and thereafter removing residual unreacted polymerizable monomeric material from the reaction mixture.

3. In the method of preparing an acrylonitrile-isobutylene copolymer synthetic resin latex by polymerizing an aqueous emulsion of a mixture of acrylonitrile and isobutylene in the presence of a peroxide catalyst, the steps of adding to the reaction mixture 0.2 to 2 parts by weight of ammonia per 100 parts of acrylonitrile and isobutylene initially present after conversion of 60% to 80% by weight of the original acrylonitrile to copolymer and before removing unreacted isobutylene and acrylonitrile, and thereafter removing residual unreacted isobutylene and acrylonitrile from the reaction mixture.

4. The method of preparing an acrylonitrile-isobutylene copolymer synthetic resin latex which comprises maintaining an aqueous emulsion of a mixture of acrylonitrile and isobutylene containing a peroxide catalyst in a closed reactor at 25° C. to 100° C. to polymerize the same, and after conversion of 60% to 80% by weight of the original acrylonitrile to copolymer and before removing unreacted isobutylene and acrylonitrile, adding to the reaction mixture 0.2 to 2 parts by weight of ammonia per 100 parts of the acrylonitrile and isobutylene initially present, and thereafter removing residual unreacted isobutylene and acrylonitrile from the reaction mixture.

5. In the method of preparing an acrylonitrile-isobutylene copolymer synthetic resin latex by polymerizing an aqueous emulsion of a mixture of acrylonitrile and isobutylene in the presence of a peroxide catalyst, the steps of removing unreacted isobutylene from the reaction mixture after conversion of 60% to 80% by weight of the original acrylonitrile to copolymer, then before removing unreacted acrylonitrile adding to the reaction mixture 0.2 to 2 parts by weight of ammonia per 100 parts of acrylonitrile and isobutylene initially present, and thereafter removing residual unreacted acrylonitrile from the reaction mixture.

6. The method of preparing an acrylonitrile-isobutylene copolymer synthetic resin latex which comprises maintaining an aqueous emulsion of a mixture of acrylonitrile and isobutylene containing a peroxide catalyst in a closed reactor at 25° C. to 100° C. to polymerize the same, and after conversion of 60% to 80% by weight of the original acrylonitrile to copolymer, removing unreacted isobutylene from the reaction mixture, then before removing unreacted acrylonitrile from the reaction mixture adding 0.2 to 2 parts by weight of ammonia per 100 parts of the acrylonitrile and isobutylene initially present, and thereafter removing residual unreacted acrylonitrile from the reaction mixture.

JOHN A. DAVISON.

(References on following page)

REFERENCES CITED

The following references are of record in the file of this patent:

UNITED STATES PATENTS

| Number | Name | Date |
|---|---|---|
| 2,456,428 | Parker | Dec. 14, 1948 |
| 2,486,241 | Arnold | Oct. 25, 1949 |
| 2,489,943 | Wilson et al. | Nov. 29, 1949 |

FOREIGN PATENTS

| Number | Country | Date |
|---|---|---|
| 573,270 | Great Britain | Nov. 14, 1945 |

OTHER REFERENCES

The Vanderbilt 1942 Rubber Handbook, 8th adition, 1942, R. T. Vanderbilt Co., New York, page 188.